United States Patent [19]

Skytøen

[11] Patent Number: 4,471,848
[45] Date of Patent: Sep. 18, 1984

[54] UNIVERSALLY MOVABLE CONTROL PANEL ASSEMBLY

[75] Inventor: Morten Skytøen, Borgheim, Norway

[73] Assignee: Towmotor Corporation, Mentor, Ohio

[21] Appl. No.: 439,658

[22] Filed: Nov. 8, 1982

[51] Int. Cl.³ .......................................... B60K 37/06
[52] U.S. Cl. ....................................... 180/90; 296/73
[58] Field of Search ................. 180/90, 315, 326, 334; 296/70, 72, 73

[56] References Cited

U.S. PATENT DOCUMENTS

| | | |
|---|---|---|
| 2,876,857 | 3/1959 | Beyerstedt . |
| 2,976,947 | 3/1961 | Cruthis et al. ........................ 180/90 |
| 3,448,821 | 6/1969 | McGuire ............................... 180/90 |
| 3,605,935 | 9/1971 | Gilbert ................................. 180/90 |
| 3,737,003 | 6/1973 | Beals et al. ........................... 180/78 |
| 3,946,827 | 3/1976 | Cadiou ................................. 180/90 |
| 4,209,074 | 6/1980 | York ..................................... 180/78 |
| 4,366,881 | 1/1983 | Frisbee ................................. 180/90 |

FOREIGN PATENT DOCUMENTS 1585880 3/1980 United Kingdom .
861122 9/1981 U.S.S.R. ................................ 180/90

Primary Examiner—Joseph F. Peters, Jr.
Assistant Examiner—Ross Weaver
Attorney, Agent, or Firm—Alan J. Hickman

[57] ABSTRACT

This invention relates to a mounting arrangement (42) for connecting a control panel assembly (18) to an operators station (10) of a vehicle (12) which solves the problems of improper control panel location, poor visibility, operator discomfort, and poor accessibility. The mounting arrangement (42) connects a lower end portion (20) of the control panel assembly (18) to the operators station (10) at a location adjacent a steering wheel assembly (16) and a seat assembly (14) and permits universal pivotal movement of the control panel assembly to a selected one of a plurality of locations relative to the steering wheel and seat assemblies (16) and (14). Thus, the problems of improper location, poor visibility, operator discomfort, and poor accessibility are eliminated. The mounting arrangement is particularly useful to connect the control panel assembly (18) to the floor (44) of a lift truck.

14 Claims, 4 Drawing Figures

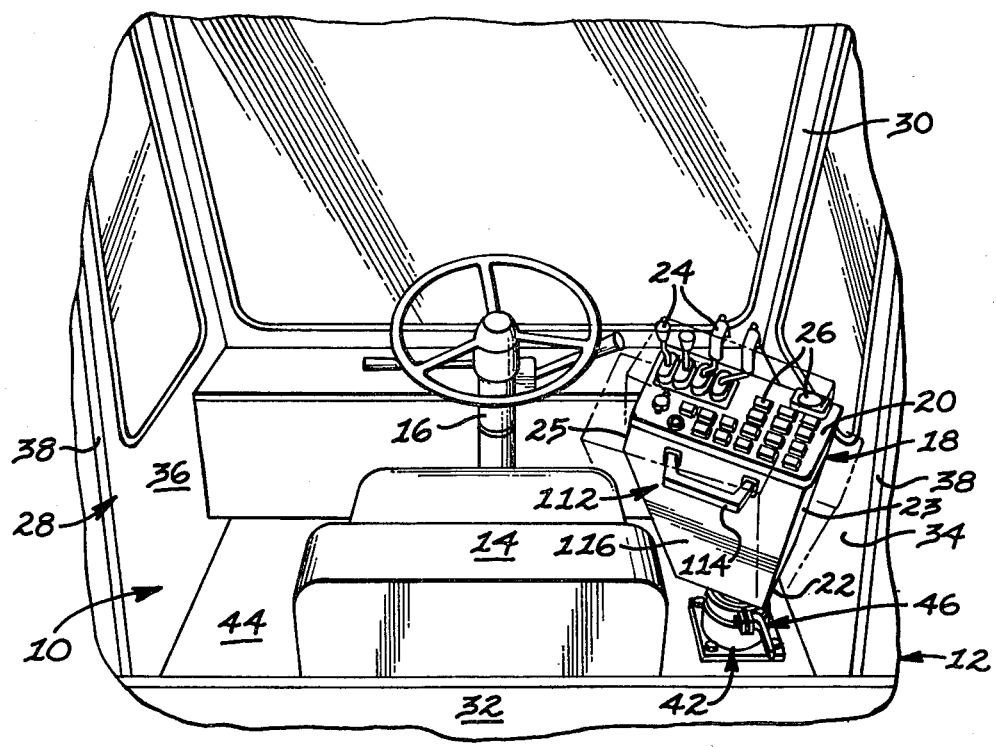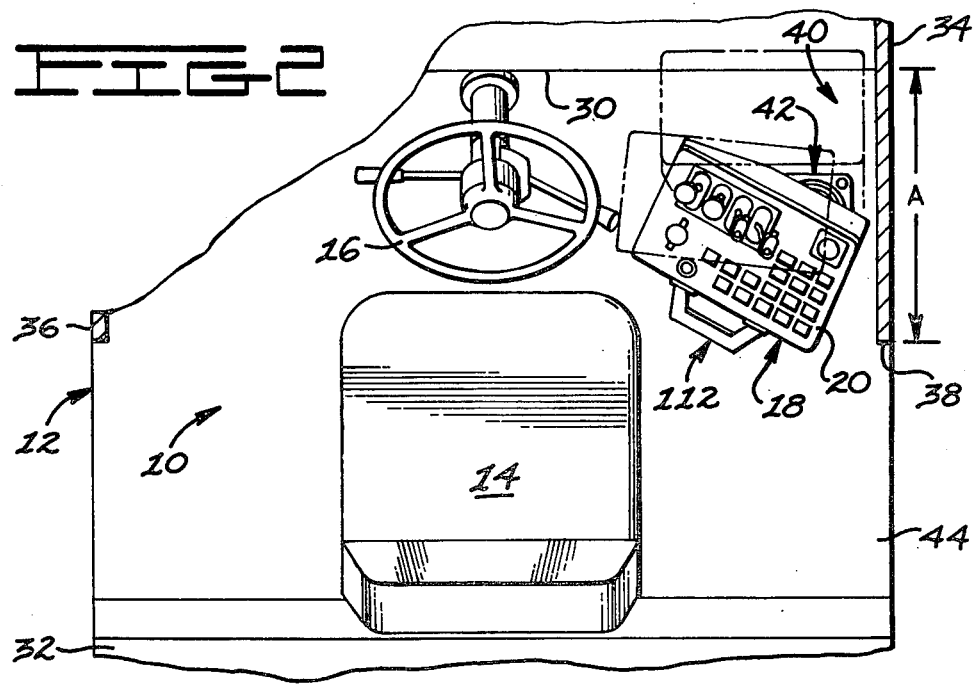

UNIVERSALLY MOVABLE CONTROL PANEL ASSEMBLY

DESCRIPTION

1. Technical Field

This invention relates generally to a movable control panel assembly and more particularly to a mounting arrangement for universally pivotally connecting a control panel assembly to an operators station of a vehicle.

2. Background Art

Devices such as control levers, gauges, indicators, switches and the like are normally mounted on the operator station of a vehicle at a fixed location relative to the operators seat. Usually the gauges and indicators are mounted at the front of the operators station as viewed by the operator, so as to be easily, readily viewed. Control levers, switches, buttons and the like which are manipulated by the operator are mounted at other fixed locations on the cab so that the operator is able to reach and manipulate them. These locations are determined according to fixed parameters established which relate to a standardized operator size norms and are therefore only ideal when the operator fits these norms. Thus for operators where size and/or physical attributes deviate from the norm the location of the devices is not ideal and in many cases unsuitable.

Attempts have been made to alleviate this problem and improve operator comfort, accuracy of control lever manipulation and thus reduce fatigue by mounting the devices so that the operator may position the devices at a number of different locations within a plane relative to the operators seat. U.S. Pat. No. 4,209,074 to L. E. York dated June 24, 1980 and U.S. Pat. No. 3,737,003 to D. E. Beals et al dated June 5, 1979 teach such an apparatus wherein the steering wheel and control levers are movable in a single plane for positioning relative to the operators. These arrangements perform satisfactory in applications where located directly in front of the operators seat. However, in applications where the devices are located to either side of the operators seat the operator is not able to position the devices at the optimum location. An example of this problem is shown in British Patent No. 1,585,890 to Lars G. Larson which published on Mar. 11, 1980.

Additionally, these planar movable devices frequently have a locking mechanism which is capable of retaining the devices at only a fixed number of incremental locations which further reduces the capability of placing the devices at an optimum location.

The present invention is directed to overcoming one or more of the problems as set forth above.

DISCLOSURE OF THE INVENTION

In one aspect of the present invention a vehicle having an operators station is provided. The operators station has a steering wheel assembly, a seat assembly and a control panel assembly having a plurality of control levers connected thereto. An apparatus mounts the control panel assembly to the operators station at a location adjacent the steering wheel and seat assemblies and permits universal pivotal movement of the control panel assembly thereabout to a selected one of a plurality of locations relative to the steering wheel and seat assemblies.

Therefore an apparatus is provided which mounts the control panel assembly and permits pivotal universal movement thereof to an optimum location, as determined by the physical attributes of the vehicle operator, at which operator comfort, accuracy of control lever operation is enhanced and operator fatigue is reduced.

BRIEF DESCRIPTION OF THE DRAWINGS

FIG. 1 is a diagrammatic isometric rear view of an embodiment of the present invention showing a vehicle operators station, seat and steering wheel assemblies, a portion of the cab, a control panel mounting arrangement and a control panel assembly in solid lines in one selected location and in phantom lines depicting other locations to which the control panel assembly is universally movable;

FIG. 2 is a diagrammatic top plan view of the operators station of FIG. 1 showing the relative locations of the steering wheel assembly, seat assembly, control panel assembly, cab walls and cab wall doorway openings;

BEST MODE FOR CARRYING OUT THE INVENTION

Figure 3:
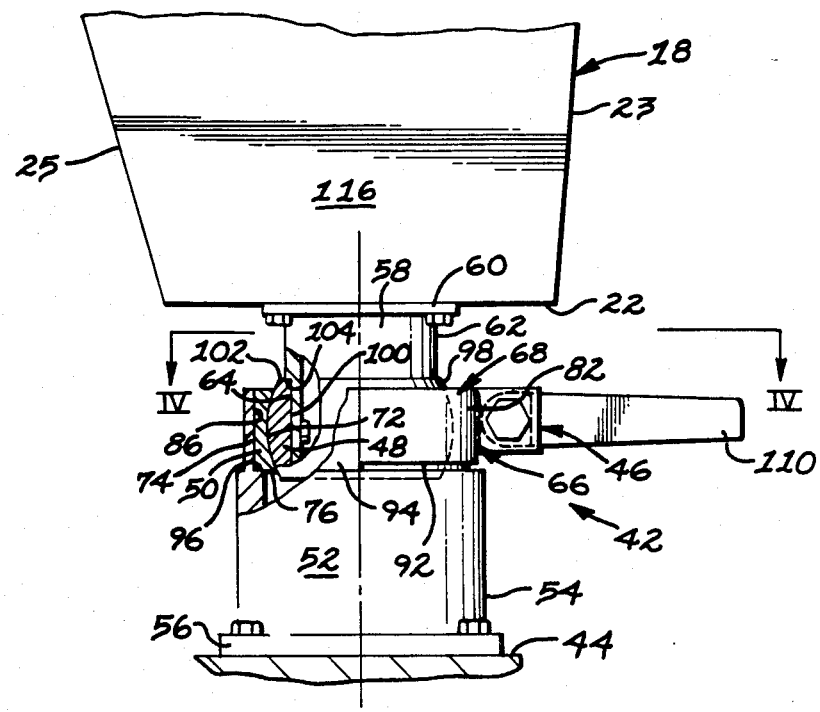
FIG. 3 is a fragmented diagrammatic side elevational view of the control panel assembly and control panel mounting arrangement of FIG. 1 shown in greater detail.

Referring to the drawings and particularly FIGS. 1 and 2, an operators station 10 of a vehicle 12 is shown. The operators station has a seat assembly 14 and a steering wheel assembly 16 mounted thereon. The seat assembly 14 is preferably mounted at the rear of the operators station 10 with the steering wheel assembly 16 mounted directly in front thereof. Both the seat assembly 14 and the steering wheel assembly 16 are adjustable to accommodate different operators with different size physical characteristics. The seat assembly allows the seat to move at least fore and aft and the steering wheel assembly to pivot towards and away from the vehicle operator.

A control panel assembly 18 having a rectangular shaped upper end 20 and a rectangular shaped lower end portion 22 interconnected by right and left inclined sides 23 and 25 is mounted on the vehicle 12 operators station 10 adjacent the seat assembly 14 and the steering wheel assembly 16. The rectangular shaped lower end portion 22 is offset a slight amount relative to the upper end 22 toward the right side 25 so as to provide extra clearance for operator leg room. The control panel assembly 18 has a plurality of control levers 24 connected thereto which extend past the upper end 20 thereof to a preselected elevational location spaced thereabove. The control levers are pivotally movable in response to actuation by the vehicle operator to control a variety of implement functions. An example would be to control lift mast (not shown) functions such as lift, tilt, side shift, and the like. Devices 26, such as gauges, switches, indicators lights and the like are connected to the upper end 20 of the control panel assembly 18 adjacent the plurality of control levers 24.

A cab assembly 28 having front, rear, right and left sides 30,32,34,36 is mounted on the vehicle 12 and surrounds the operators station 10. A doorway 38 is provided in each of the right and left sides of the cab to permit entrance of an operator therein. The doorway 38 on the right side 34 is spaced from the front side 30 of the cab a preselected distance "A" and defines a blind front corner area 40 with the front 30 and rear 32 sides.

A mounting arrangement 42 is provided for connecting the lower end portion 22 of the control panel assembly to a floor 44 of the operators station 10. The mounting arrangement 42 is constructed to permit universal pivotal and rotational movement of the control panel assembly thereabout to an infinite number of locations relative to the steering wheel assembly 16 and the seat assembly 14. The mounting arrangement 42 is preferably centrally connected to the lower end portion 22, offset relative to the upper end 20 and thus closer to the right side 23 at the junction of the right side and upper end 20. The mounting arrangement also includes a locking apparatus 46 for selectively retaining the control panel assembly at a selected universal pivoted and rotated location.

Figure 4:
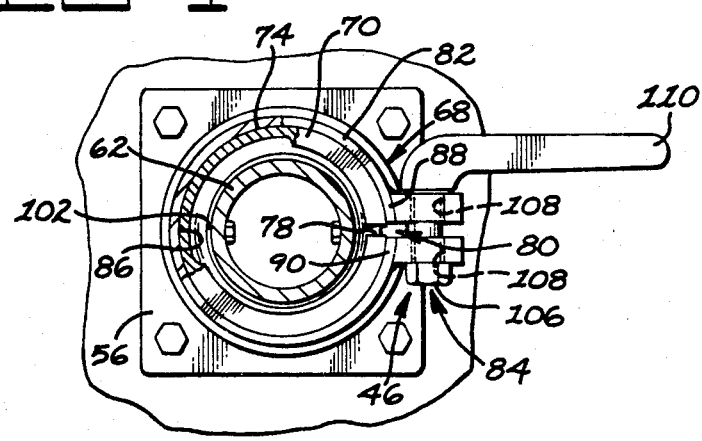
FIG. 4 is a diagrammatic sectional view taken along lines IV—IV of FIG. 3 showing the mounting arrangement in even greater detail.

Referring to FIGS. 3 and 4, the mounting arrangement 42 has a spherical ball 48 which is connected to the lower end portion 22 of the control panel assembly 18 and a spherical seat 50 which is connected to the floor 44 of the operators station 10. The spherical ball 48 is matingly engaged with the spherical seat and universally pivotable and rotatable relative to the spherical seat 50. More specifically, the mounting arrangement 42 has a base member 52 which includes a first sleeve 54 and a first flange 56. The first sleeve 54 is connected to the first flange 56 and the first flange is connected to the floor 44. The spherical seat 50 is mounted on the first sleeve 54 and retained thereon in a manner which will be discussed later. The mounting arrangement 42 also includes a support member 58 which has a second flange 60 and a second sleeve 62. The spherical ball 48 is connected to a reduced diameter portion 64 of the second sleeve 62 and the second flange 60 is securely connected to the lower end portion 22 of the control panel assembly 18.

The locking arrangement 46 has a device 66 for forcibly urging one of the spherical ball 48 and the spherical seat 50 into clamping engagement with the other of the spherical ball and spherical seat 48 and 50. The device 66 preferably has a clamp member 68 which is connected to the first sleeve 54 and engageable with the spherical seat 50.

The spherical seat 50 is preferably configured as a split ring 70 having a concave spherical bore surface 72, an outer cylindrical surface 74 and a ring end surface 76. The split ring 70 has a pair of facing ends 78 which define a gap 80 therebetween. This gap permits the ring to be compressed a preselected amount which changes the diameter of the spherical bore surface and thus allows variations in the amount of frictional clamping force to be applied to the spherical ball 48.

The clamp member 68 has a C-shaped flange 82 and an adjustable fastener 84. The C-shaped flange 82 has an inner cylindrical surface 86, first and second spaced apart end portions 88 and 90 and a bottom surface 92. The bottom surface has a middle portion 94 which is connected to an upper end 96 of the first sleeve 54. The adjustable fastener 84 is preferably connected to the first and second end portions 88 and 90 of the C-shaped flange 82. The split ring 70 is disposed in the C-shaped flange with the outer cylindrical surface 74 of the split ring 70 being in contactable engagement with the inner cylindrical surface 86 of the C-shaped flange 82. Thus it can be seen that adjustment of the C-shaped flange as provided for by the adjustable fastener 84 will cause the C-shaped flange 82 to move into forcible compressive engagement with the split ring 70 which results in the split ring being moved into compressible engagement with the spherical ball 48. Thus the control panel assembly 18 will either be universally, pivotally and rotatably movable about the spherical seat 50 or restrained from movement as a result of the clamping force applied, by the adjustable fastener 84 to the spherical ball and spherical seat 48 and 50 via the C-shaped flange 82.

The spherical ball 48 has a convex spherical outer surface 98, a bore 100 and a end surface 102 which interconnects the bore to the spherical outer surface. The reduced diameter portion 64 of second sleeve 62 is disposed in the bore 100 of the spherical ball 48 and the ball end surface 102 is contactable with a shoulder 104 on the second sleeve 62 at the termination of the reduced diameter portion 64. Thus the spherical ball 48 is retained from axial movement along the reduced diameter portion 64 in a direction towards the lower end portion 22 of the control panel assembly 18 by contact between the ball end surface 102 and the shoulder 104. Similarly, the spherical seat 50 is retained from axial movement relative to the first sleeve 54 in a direction towards the first flange 56 by contact between the end surface 76 of the split ring 70 and the upper end 96 of the first sleeve 54.

The adjustable fastener 84 preferably includes a threaded fastener 106, such as a bolt, stud and the like which is disposed in an aperture 108 located in each of the first and second end portions 88 and 90 of the C-shaped flange 82. A lever 110 is screwthreadably engaged with the threaded portion of the fastener 106 and rotatable in one direction to forcibly, contactably engage one of the first and second end portions 88 and 90 of the C-shaped flange 82. This forces the flanges towards one another which results in clamping engagement of the flange and split ring 70. Conversely rotation of the lever 110 in the opposite direction will reduce the amount of forcible engagement between the C-shaped flange 82 and the split ring 70 and thus release the spherical ball 48 for universal pivotal movement. It is to be noted that the first and second end portions 88 and 90 are spaced from the upper end 96 of the first sleeve 54 at the bottom surface 92. Thus the end portions 88 and 90 move in response to the disposition of the lever 110 on the threaded fastener 106. This is advantageous since it results in the clamping force being applied to the split ring 70 is over a greater surface area which results in better distribution of a clamping force and thus reduces the potential for bending distortion and the like.

Referring to FIGS. 1 and 2, a grip 112 is provided on the control panel assembly 18 which is engageable by the vehicle operator for universally pivotally moving the control panel assembly to any desired location. The grip 112 is preferably a handle 114 having a U-shaped configuration and connected to a front side 116 of the control panel assembly 18.

INDUSTRIAL APPLICABILITY

In operation, the operator of the lift truck enters the cab 28 through the right side 34 doorway 38 to gain access to the operators station 10, passes the control panel assembly 18 and sits on the seat assembly 14. Ideally the control panel assembly was located at the blind corner area 40 closely adjacent the front side 30 and right side 34. When the control panel assembly 18 is at this location access from the doorway 38 to the seat assembly 14 is excellent. After the seat assembly 14 is adjusted in the fore/aft direction and the steering wheel assembly is adjusted to the proper inclination, the operator is ready to adjust the control panel assembly. The operator grabs handle 114 with one hand and the lever 110 with the other hand. The lever 110 is then rotated in the proper direction to release the C-shaped flange from restraining the spherical ball 48 which permits pivotal movement of the spherical ball and the control panel assembly 18 about the spherical seat 50. The operator then pivots the control panel assembly 18 to a location closer the steering wheel and seat assemblies 16 and 14. As previously noted, the optimum location is determined by the operator's size and his physical attributes. If the operator has long arms, the location of the control panel assembly 18 will be spaced a further distance from the steering wheel and seat assembly than if the operator had short arms. Since the control panel assembly is pivotally universally movable, the number of locations possible are substantial. It should also be noted that the control panel assembly 18 is rotatable about the spherical seat to permit orientation of the upper end 20 of the control panel and the control levers 24 in a proper facing relationship to the vehicle operator. This feature allows the upper end 20 to be adjusted for further comfort and visibility so that the control levers 24 and the devices 26 mounted thereon are readily accessible and visible. The offset upper end 20 allows the mounting arrangement to be closely adjacent the right cab side 34 and thus improves leg room and provides close corner storage.

Upon placing the control panel assembly 18 in the proper location, the operator will rotate the lever 110 in the opposite direction to a locked position. At this position, the C-shaped flange will be in clamping engagement with the split ring 70 and the split ring will be in clamping engagement with the spherical outer surface 98 of the spherical ball 48. Upon completion of the above-noted adjustments, the vehicle is now ready to perform its normal workday functions.

To exit the vehicle, the steps previously indicated should be performed by the vehicle operator in reverse order. By placing the control panel assembly 18 in the corner 40 close to the cab right side 34 and front side 30, the operator can easily freely exit the vehicle operators station 10 and cab assembly 28 from the right side without interference and difficulty.

Thus it can be seen that the mounting arrangement 42 for the control panel assembly 18 provides a unique solution to the aforementioned problems and permits ease of adjustment of the control panel assembly 18 to the optimum location wherein operator comfort and accessibility is superior and permits ease of access to the operator's seat 14.

Other aspects, objects and advantages of the invention can be obtained from a study of the drawings, disclosure and appended claims.

I claim:

1. In a vehicle (12) having an operators station (10), said operators station (10) having a steering wheel assembly (16), a seat assembly (14), and a floor (44); the improvement comprising:
   a control panel assembly (18) having an upper end (20) and a lower end portion (22);
   a plurality of control levers (24) pivotally connected to said control panel assembly (18) and extending past said upper end (20) to a preselected elevational location spaced thereabove;
   means (42) for mounting the lower end portion (20) of said control panel assembly (18) to the operators station (10) at a location adjacent the steering wheel and seat assemblies (16,14) and permitting universal pivotal movement of said control panel assembly (18) to a selected one of a plurality of locations relative to the steering wheel and seat assemblies (16,14), said mounted means (42) having a spherical ball (48) and a spherical seat (50), said spherical seat (50) being connected to one of said floor (44) and the lower end portion (22) of said control panel assembly (18), and said spherical ball (48) being connected to the other of said floor (44) and the lower end portion (22) of said control panel assembly (18), said spherical ball (48) being matingly engaged with said spherical seat 50; and
   means (46) for releasably locking said control panel assembly (18) at said location selected and maintaining said control panel assembly (18) against universal movement, said means for locking (46) includes, means (66) for forceably urging one of said ball and seat (48,50) into clamping engagement with the other of said ball and seat (48,50).

2. The vehicle (12) as set forth in claim 1 wherein said means for mounting (42) permits a preselected amount of rotational movement of said control panel assembly (18) about and relative to said spherical seat (50).

3. The vehicle (12) as set forth in claim 1 wherein said means for mounting (42) includes;
   a base member (52) having a first flange (56) and a first sleeve (54) connected to said first flange (56), said first flange being connected to said floor (44) and said first sleeve (54) being connected to said spherical seat (50), and
   a support member (58) having a second flange (60) and a second sleeve (62) connected to said second flange (60), and a second flange (60) being connected to the lower end portion (22) of said control panel assembly (18) and said second sleeve (62) being connected to said spherical ball (48), and said means for forceably urging (66) includes;
   a clamp member (68) connected to said first sleeve (54) and engageable with said spherical seat (50).

4. The vehicle (12) as set forth in claim 3 wherein said first sleeve (54) has an upper end (96) and said spherical seat (50) includes;
   a split ring (70) having a concave spherical bore surface (72) and an outer cylindrical surface (74), and said clamp member (68) includes;
   a C-shaped flange (82) and an adjustable fastener (84), said C-shaped flange (82) having an inner cylindrical surface (86), first and second spaced apart end portions (88,90) and a bottom surface (92), said bottom surface having a middle portion (94) and being connected at said middle portion (94) to the upper end (96) of said first sleeve (54) and said adjustable fastener (84) being connected to the first and second end portions (88,90) of said C-shaped flange, said split ring (70) being disposed in said C-shaped flange and said C-shaped flange inner cylindrical surface (86) being contactably engaged with the outer cylindrical surface (74) of said split ring (74), said split ring (70) being movable into compressing engagement with said spherical ball (48) in response to compressing engagement by said C-shaped flange (82), said C-shaped flange (82) being adjustable into compressing engagement with said split ring (70) in response to movement of said adjustable fastener (84).

5. The vehicle (12) as set forth in claim 4 wherein the second sleeve (62) of said support member (58) includes;
   an outer cylindrical reduced diameter portion (64) defining a shoulder (104) and said spherical ball (48) includes;
   a convex spherical outer surface (98), a bore (100) disposed in said spherical ball (48) and a ball end surface (102) connecting said bore (100) to said spherical outer surface, said reduced diameter portion (64) being disposed in said bore (100) and said ball end surface (102) being contactably supportingly engaged with said shoulder (104).

6. The vehicle as set forth in claim 4 wherein said split ring further includes;
   a ring end surface (76), said ring end surface (76) being contactably supportingly engaged with the upper end (96) of said first sleeve (54).

7. The vehicle (12) as set forth in claim 4 wherein the first and second (88,90) end portions of said C-shaped flange (82) each have an aperture (108) disposed therethrough and said adjustable fastener (84) includes;
   a bolt (106) disposed in said apertures (108) and a lever (110) screwthreadably engaged with said bolt and selectively forceably contactable with one of the first and second end portions (88,90) of said C-shaped flange (82), said first and second end portions (88,90) being movable relative to the upper end (96) of said first sleeve (54).

8. The vehicle as set forth in claim 4 wherein the bottom surface (92) of said C-shaped flange (82) at said first and second end portions (88,90) is spaced from and free from contact with the upper end (96) of said first sleeve (54), said first and second end portions (88,90) being movable relative to the upper end (96) of said first sleeve (54).

9. The vehicle (12) as set forth in claim 1 wherein said steering wheel assembly (16) is located directly in front of said seat assembly (14) a preselected distance therefrom, and said mounting means (42) being connected to said floor (44) at a location in front of said seat assembly (14) and to one side of the steering wheel assembly (16).

10. The vehicle (12) as set forth in claim 9 wherein said operators station (10) includes;
    a cab (28) having a front (30), a side (34) and a doorway (38) in said side (34), said doorway (38) being spaced from said front (30) a preselected distance (A) defining a corner (40), said control panel assembly (18) being movable from a doorway (38) blocking location to a location spaced from blocking said doorway (38) and adjacent said corner (40).

11. The vehicle (12) as set forth in claim 1 wherein said control panel assembly (18) includes;
    means (112) for moving said control panel assembly (18) to said selected one of the plurality of locations.

12. The vehicle (12) as set forth in claim 11 wherein said control panel assembly (18) includes a front side (116) and said means for moving includes;
    a handle (114) connected to said front side (116).

13. The vehicle as set forth in claim 1 wherein said control panel assembly (18) has right (23) and left (25) inclined sides interconnecting said upper end (20) and said lower end portion (22), said mounting means being positioned at a location closer to the right side (23) of the control panel assembly (18) at the junction of the right side (23) and upper end (20) than to the left side (25) of the control panel assembly (18) at the junction of the left side (25) and the upper end (20).

14. A mounting arrangement (42) for connecting a control panel assembly (18) to a vehicle (12); comprising:
    a spherical seat (50) connected to one of said control panel assembly (18) and said vehicle (12);
    a spherical ball (48) connected to the other of said control panel assembly (18) and said vehicle (12) and being matingly engaged with said spherical seat (50), one of said spherical ball (48) connected to the other of said control panel assembly (18) and said vehicle (12) and being matingly engaged with said spherical seat (50), one of said spherical ball (48) and seat (50) being pivotable relative to the other of said spherical ball (48) and seat (50), said control panel assembly (18) being universally pivotally movable in a multiplicity of directions to a selected one of a multiplicity of locations in response to relative pivotal movement of said spherical ball and seat; and
    means (66) for forceably urging one of said ball and seat (48,50) into clamping engagement with the other of said ball and seat (50,48) and maintaining said control panel assembly (18) at said selected one of said multiplicity of locations.

* * * * *

UNITED STATES PATENT AND TRADEMARK OFFICE
CERTIFICATE OF CORRECTION

PATENT NO. : 4,471,848
DATED : September 18, 1984
INVENTOR(S) : Morten Skytøen

It is certified that error appears in the above-identified patent and that said Letters Patent are hereby corrected as shown below:

Column 8, lines 31-34:
 delete "one of said spherical ball (48) connected to the other of said control panel assembly (18) and said vehicle (12) and being matingly engaged with said spherical seat (50),".

Signed and Sealed this

Nineteenth Day of February 1985

[SEAL]

Attest:

DONALD J. QUIGG

Attesting Officer     Acting Commissioner of Patents and Trademarks